1/29/83   XR   4,417,475

United States Patent [19]
Okazaki

[11] 4,417,475
[45] Nov. 29, 1983

[54] ULTRASONIC DIAGNOSING APPARATUS

[75] Inventor: Takahisa Okazaki, Otawara, Japan

[73] Assignee: Tokyo Shibaura Denki Kabushiki Kaisha, Kawasaki, Japan

[21] Appl. No.: 247,153

[22] Filed: Mar. 24, 1981

[30] Foreign Application Priority Data

Mar. 29, 1980 [JP] Japan ................................. 55-40708

[51] Int. Cl.³ .............................................. G01N 2900
[52] U.S. Cl. ...................................... 73/606; 73/626; 128/660
[58] Field of Search ...................... 128/660; 367/11, 7, 367/103, 105, 119, 122, 124, 138; 73/625, 626, 606, 607

[56]       References Cited
       U.S. PATENT DOCUMENTS

| 3,856,985 | 12/1974 | Yokoi et al. ...................... 128/660 X |
| 3,885,224 | 5/1975 | Klahr ..................................... 367/11 |
| 4,063,549 | 12/1977 | Beretsky et al. ...................... 73/626 X |
| 4,102,205 | 7/1978 | Pies et al. ............................... 73/626 |
| 4,137,775 | 2/1979 | Le May ............................. 73/626 X |
| 4,140,022 | 2/1979 | Maslak .................................. 73/626 |
| 4,145,931 | 3/1979 | Tancrell ................................ 73/626 |
| 4,167,753 | 9/1979 | Lynk .................................. 367/11 X |
| 4,206,653 | 6/1980 | Le May ............................. 73/626 X |
| 4,234,937 | 11/1980 | Eggleton et al. ...................... 367/11 |
| 4,320,660 | 3/1982 | Tancrell ............................... 73/626 |
| 4,348,902 | 9/1982 | Tachita ................................. 73/626 |

FOREIGN PATENT DOCUMENTS

| 22966 | 1/1981 | European Pat. Off. ............ 128/660 |
| 24540 | 3/1981 | European Pat. Off. ............ 128/660 |
| 52-44684 | 4/1977 | Japan . |

*Primary Examiner*—Stephen A. Kreitman
*Attorney, Agent, or Firm*—Finnegan, Henderson, Farabow, Garrett & Dunner

[57]            ABSTRACT

An ultrasonic diagnosing apparatus comprising a probe for radiating ultrasonic wave beams toward a target and converting ultrasonic echo data reflected from the target into electrical signals indicative of a tomogram of the target, an ultrasonic wave transmission and reception circuit for controlling the probe to radiate the ultrasonic wave beams in predetermined ultrasonic field patterns, a processor for processing the electrical signals in accordance with correlations among the ultrasonic echo data, which depend upon the ultrasonic field patterns to eliminate artifact components of the tomogram from the electrical signals, a display device for displaying the tomogram of the target in response to the output signal of the processor, and a system pulse generator for generating a system synchronizing pulse supplied to the transmission and reception circuit and processor.

10 Claims, 21 Drawing Figures

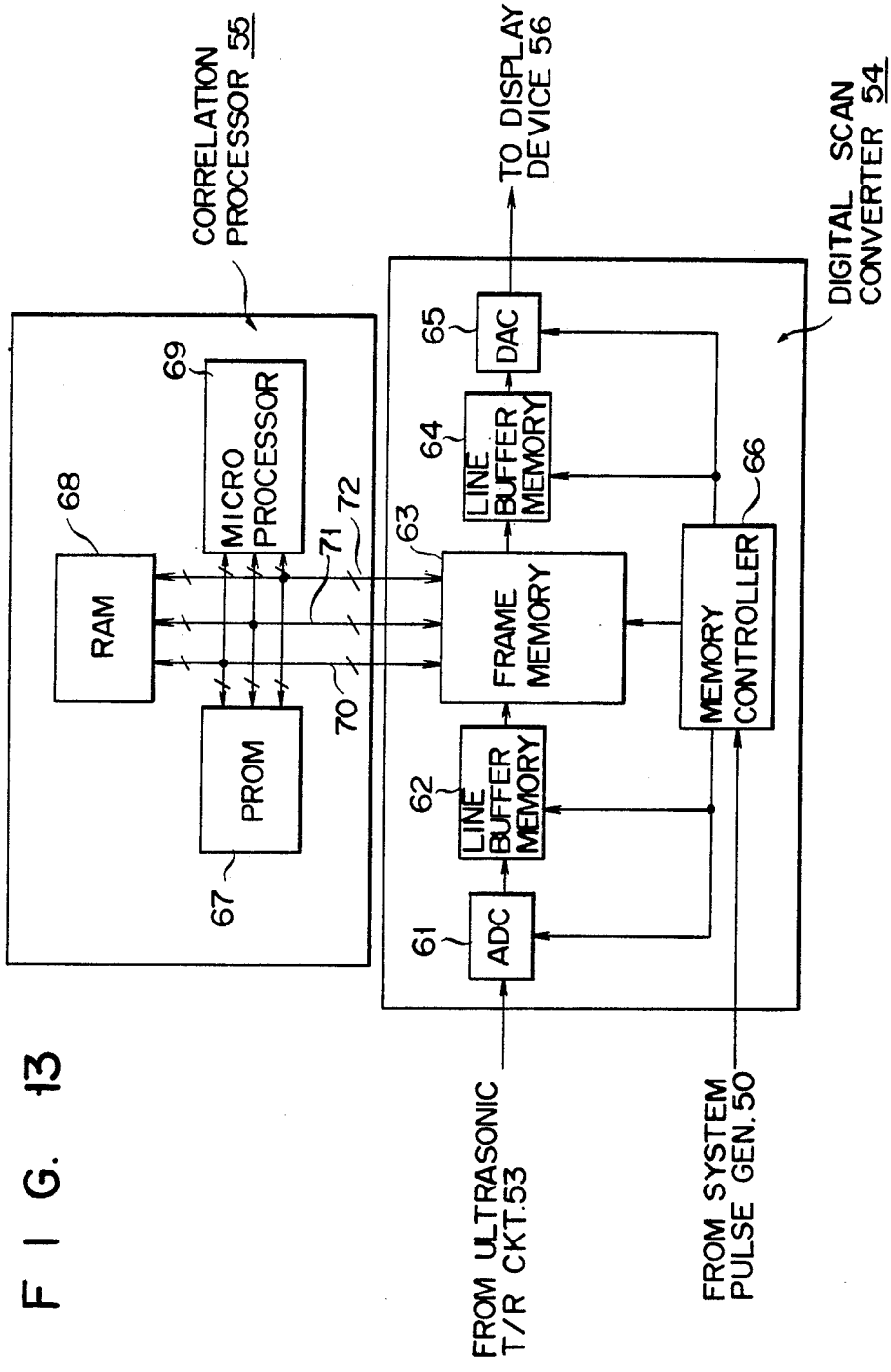
F I G. 13

ULTRASONIC DIAGNOSING APPARATUS

This invention relates to an ultrasonic diagnosing apparatus capable of displaying a tomogram of a fine resolution.

A conventional ultrasonic diagnosing apparatus of electronic scanning type has an ultrasonic probe which includes a plurality of ultrasonic transducers (a transducer array) arranged side by side at regular intervals. The probe is put on an object under examination e.g. a patient's body, and the transducers are excited to radiate ultrasonic wave beams. The ultrasonic wave beams propagate into the patient's body and reflect from tissues within the patient's body in accordance with their acoustic impedances. Ultrasonic echo data reflected from the tissues are used to provide a B-mode image (tomogram) for a diagnosis of the patient.

The probe may be driven to achieve linear scanning on the patient in the following known manner. The first n transducers of the probe are excited at the same time, then the second to (n+1)th transducers, for example, are excited, further the third to (n+2)th transducers are excited, and so forth. In this case, ultrasonic wave beams radiated by the probe are shifted laterally one after another at a pitch which is equal to the distance between the central axes of adjacent two transducers. The ultrasonic wave beams linearly scan a desired plane within the patient's body.

Alternatively, it is also well known that the transducers of the probe are excited in given phases (time delays) to radiate ultrasonic wave beams in a sector scanning manner. The ultrasonic diagnosing apparatus of the sector scanning type is especially suitable for diagnosis of the heart of a human being, because the ultrasonic wave beams can be radiated between ribs toward the heart.

In the ultrasonic diagnosing apparatus, the transducers receive the ultrasonic echo data reflected from tissues on a desired plane, and convert the same into electrical signal and signal processing circuits process the electrical signals to obtain a B-mode (tomogram) of the desired plane.

To provide a tomogram with a high resolution it is effective to focus the ultrasonic wave beams so that the beams may reflect only from the desired portions of the plane. In practice, however, it is difficult to generate an ultrasonic wave beam narrow enough to scan only a desired portion of a plane. Ultrasonic wave beams being not sufficiently narrow, the reflected ultrasonic echoes inevitably contain data (artifact components) about the portions of the plane other than the desired portion. Consequently, the tomogram quality becomes a low resolution.

More detailed explanation with regard to a conventional ultrasonic diagnosing apparatus of an electronic scanning type will be described hereinbelow with reference to FIGS. 1 and 2. In the ultrasonic diagnosing apparatus, a specific plane within a patient's body is subjected to linear scanning by means of such a probe as shown in FIG. 1. This probe has 64 transducers A1 to A64, for instance. The transducers A1 to A64 are excited, eight at a time by a drive pulse supplied to the probe 64. First the transducers A1 to A8 are excited, next the transducers A2 to A9, then the transducers A3 to A10, and so on. The resultant ultrasonic wave beam which the transducers A1 to A8 radiate defines an ultrasonic field pattern S1 indicated by the solid lines, the resultant ultrasonic wave beam which the transducers A2 to A9 radiate defines an ultrasonic field pattern S2 indicated by the broken lines, and so forth, in which a vertical line l1 represents the symmetrical axis of the ultrasonic field pattern S1 passing a point halfway between the transducers A4 and A5 while a vertical line l2 represents that of the ultrasonic field pattern S2 passing a point halfway between the transducers A5 and A6.

Ultrasonic echo data obtained from the ultrasonic field pattern S1 are processed to obtain tomogram components of the object under examination, which is displayed on a scanning line L1 of the screen of a cathode ray tube (CRT) as shown in FIG. 2. Likewise, ultrasonic echo data obtained from the ultrasonic field pattern S2 are processed to be displayed on a scanning line L2 as shown also in FIG. 2. The distance "d" between scanning lines L1 and L2 is proportional to the interval "d" at which adjacent two transducers of the probe are arranged.

The ultrasonic field patterns S1, S2, ... are broad and the ultrasonic wave beams are not sufficiently narrow. Therefore, the tomogram components displayed on the scanning line L1 are provided by processing all the data obtained from the broad ultrasonic field pattern S1—not only the ultrasonic echo data from the desired positions of a plane within the patient's body but also the ultrasonic echo data (artifact components) from other positions of the plane. Similarly, the tomogram components displayed on the scanning line L2 are provided by processing all the data obtained from the broad ultrasonic field pattern S2—not only the ultrasonic echo data from the desired positions of the plane but also the ultrasonic echoes from other positions of the plane. This results in the resultant tomogram with a low resolution.

It is an object of this invention to provide an ultrasonic diagnosing apparatus which may remove unnecessary components from all the data obtained by scanning a plane within a subject under examination thereby to provide a tomogram with an improved resolution.

According to this invention there is provided an ultrasonic diagnosing apparatus which comprises:

probe means for radiating ultrasonic wave beams toward a target and converting ultrasonic echo data reflected from the target into electrical signals indicative of a tomogram of the target;

means for controlling said probe means to radiate the ultrasonic wave beams in predetermined ultrasonic field patterns;

means for processing the electrical signals in accordance with correlations among the ultrasonic echo data, which depend upon the ultrasonic field patterns to eliminate artifact components of the tomogram from the electrical signals;

means for displaying the tomogram of the target in response to the output signal of said processing means; and means for generating a system synchronizing pulse supplied to said controlling means and processing means.

This invention can be more fully understood from the following detailed description when taken in conjunction with the accompanying drawings, in which:

FIG. 13 shows a block diagram of the digital scan converter incorporated in the apparatus of FIG. 11;

With reference to FIG. 3 to FIGS. 16A, 16B and 16C an ultrasonic diagnosing apparatus embodying this invention will be described.

First, it will be explained that the basic concept of a correlation processing technique may be applied to an ultrasonic diagnosing apparatus in accordance with the present invention.

Figure 1:
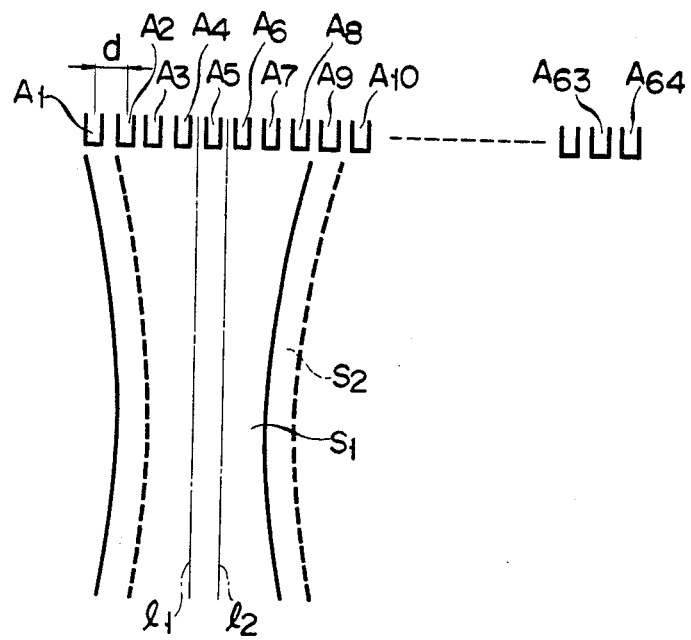
FIG. 1 shows an ultrasonic probe comprised of a plurality of transducers and ultrasonic field patterns defined by ultrasonic wave beams radiated from the transducers.
Figure 2:
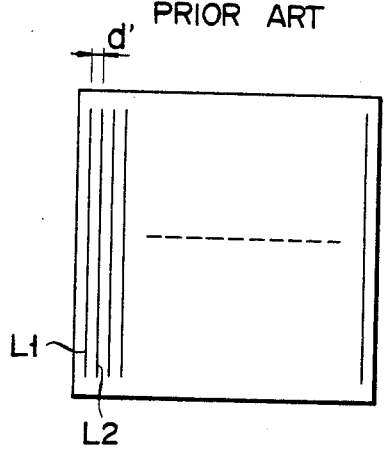
FIG. 2 shows a cathode ray tube (CRT) screen for displaying a tomogram provided by processing data obtained by the transducers shown in FIG. 1.
Figure 3:
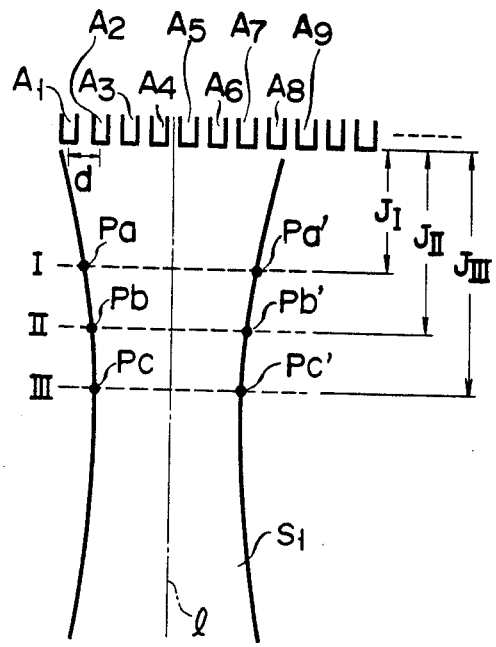
FIG. 3 shows a plurality of transducers and an ultrasonic field pattern defined by ultrasonic wave beams radiated from the transducers.
Figure 4:
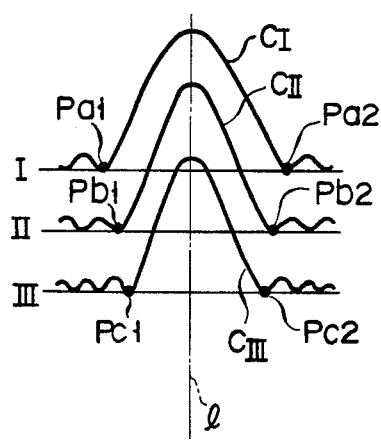
FIG. 4 shows ultrasonic intensity distribution curves CI, CII and CIII on the planes I, II and III perpendicular to the axis l of the field pattern S1.

Shown in FIG. 3 is an ultrasonic field pattern S1 defined by ultrasonic wave beams which the first eight transducers A1 to A8 radiate at the same time, in which a vertical line l is the symmetrical axis of the ultrasonic field pattern S1. FIG. 4 shows ultrasonic intensity distribution curves CI, CII and CIII on the planes I, II and III which are perpendicular to the axis l of the field pattern S1 and are located at distances JI, JII and JIII from the transducers A1 to A8, in which the axis parallel to the symmetrical axis l in FIG. 4 represents an ultrasonic intensity level. Pa1 and Pa2 denote the locations on the plane I which are nearest the axis l and at which the ultrasonic intensity level is minimum. Likewise, Pb1 and Pb2 designate the locations on the plane II which are nearest the axis l and at which the ultrasonic level is minimum, and Pc1 and Pc2 are the locations on the plane III which are nearest the axis l and at which the ultrasonic level is minimum.

The small side lobes of the curves CI, CII and CIII are not illustrated in FIG. 3.

As evident from FIG. 4, on a plane at any distance from the transducers A1, A2, A3, . . . the ultrasonic intensity level is the highest at the position where the axis l of the ultrasonic field pattern S1 passes. The ultrasonic level is lower at the position farther from the axis l of the ultrasonic field pattern S1.

Figure 5:
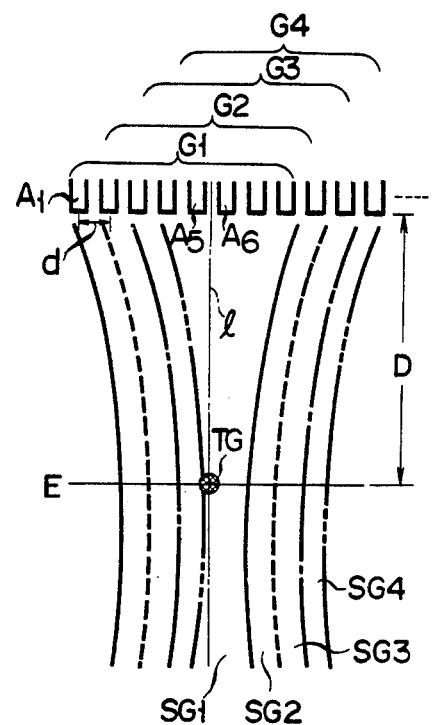
FIG. 5 shows ultrasonic field patterns SG1, SG2, SG3 and SG4 defined respectively by ultrasonic wave beams which the transducers of group G1, those of group G2, those of group G3 and those of group G4 radiate, respectively.

As illustrated in FIG. 5, let the transducers A1 to A8 which are excited first be referred to as "group G1", the transducers A2 to A9 which are excited next be referred to as "group G2", the transducers A3 to A10 which are excited thereafter be referred to as "group G3", and so on. If only the axis l of the ultrasonic field pattern SG2 generated by group G2 passes a target TG whose lateral size is less than the interval "d" defined by the central axis of the adjacent two transducers, the ultrasonic echo data from the target TG have a higher ultrasonic intensity level than any data obtained from ultrasonic field patterns SG1, SG3, SG4, . . . which are generated respectively by groups G1, G3, G4, . . . This will be better understood with reference to FIGS. 6A to 6D in which shown are ultrasonic intensity distribution curves on a plane E which is perpendicular to the axis l of the field pattern SG2 and is located at a distance D.

Figure 6A:
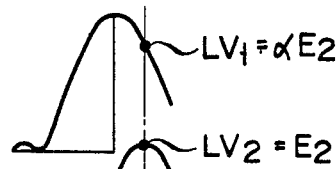
FIGS. 6A, 6B, 6C and 6D show ultrasonic intensity distribution curves on a plane E which is perpendicular to the axis l of the field pattern SG2 and is located at a distance D.
Figure 6B:
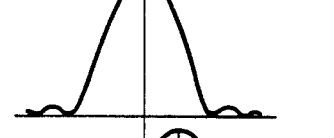
Figure 6C:
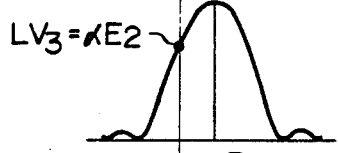
Figure 6D:
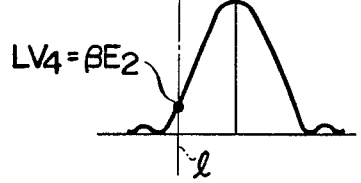

As shown in FIG. 6A, the data obtained from the target TG when group G1 is excited to generate the ultrasonic field pattern SG1 have an ultrasonic intensity level LV1. As shown in FIG. 6B, the data obtained from the target TG when group G2 is excited to generate the ultrasonic field pattern SG2 have an ultrasonic intensity level LV2. Similarly, as shown in FIG. 6C, the data obtained from the target TG when group G3 is excited to generate the ultrasonic intensity field pattern SG3 have an ultrasonic intensity level LV3. Further, as shown in FIG. 6D, the data obtained from the target TG when group G4 is excited to generate the ultrasonic field pattern SG4 have an ultrasonic intensity level LV4. Obviously, the ultrasonic intensity level LV2 is the highest because the axis l of the ultrasonic field pattern SG2 passes the target TG. By contrast, the ultrasonic intensity level LV4 is the lowest because the axis of the ultrasonic field pattern SG4 passes the position which is farther from the target TG than the positions where the symmetrical axes of the ultrasonic field patterns SG1 and SG3 intersect with the plane E.

Since the ultrasonic field patterns SG1 to SG4 have substantially the same ultrasonic intensity distribution curves on the plane E at the distance D from the transducer array while the adjacent two axes are laterally displaced at the distance "d", as shown in FIGS. 5 and 6A to 6D, the intensity levels LV1, LV2, LV3 and LV4 have $\alpha E2$, $E2$, $\alpha E2$ and $\beta E2$, respectively, where coefficients $\alpha$ and $\beta$ are contribution rates for forming artifacts (undesired tomogram components) which are determined by ratios of $LV1/LV2 = LV3/LV2$ and $LV4/LV2$, respectively, while the rate of $\alpha$ is larger than that of $\beta$.

Figure 7:
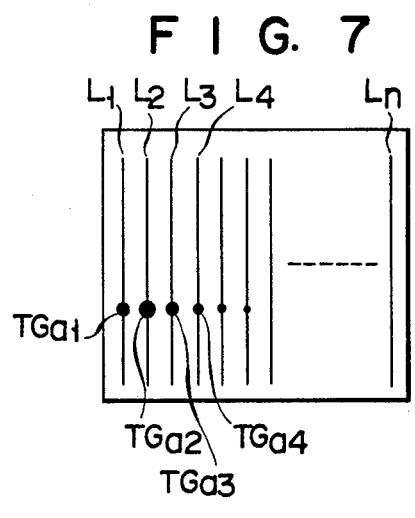
FIG. 7 shows the screen of a CRT display device, which displays ultrasonic echo data from the ultrasonic field patterns SG1, SG2, SG3 and SG4, respectively on the scanning lines L1, L2, L3 and L4.

The ultrasonic echo data obtained from the ultrasonic field patterns SG1 to SG4, are displayed respectively on the scanning lines L1, L2, L3 and L4 of a CRT display device in response to tomogram components TGa1, TGa2, TGa3 and TGa4 as shown in FIG. 7. Each of the tomogram components TGa1 to TGa4 has brightness which is proportional to the ultrasonic echo intensity. The tomogram component TGa2 is the most bright of all the tomogram components because it corresponds to the data obtained from the ultrasonic field pattern SG2 whose axis l passes the target TG. The tomogram components TGa1 and TGa3 are less bright than the tomogram component TGa2 because they correspond to the data obtained from the ultrasonic field patterns SG1 and SG3 whose axes are set apart from the axis l at the distance "d" equal to the interval between the central axes of the adjacent two transducers. The tomogram component TGa4 is the least bright of all because it corresponds to the data obtained from the ultrasonic field pattern SG4 whose axis is set apart from that of the ultrasonic field pattern SG3 at the distance "d".

Of these tomogram components TGa1, TGa2, TGa3 and TGa4 shown in FIG. 7, only the component TGa2 is a desired tomogram component. The remaining components TGa1, TGa3 and TGa4 of the tomogram are unnecessary components because the actual lateral size of the target TG is smaller than the interval "d".

Figure 8:
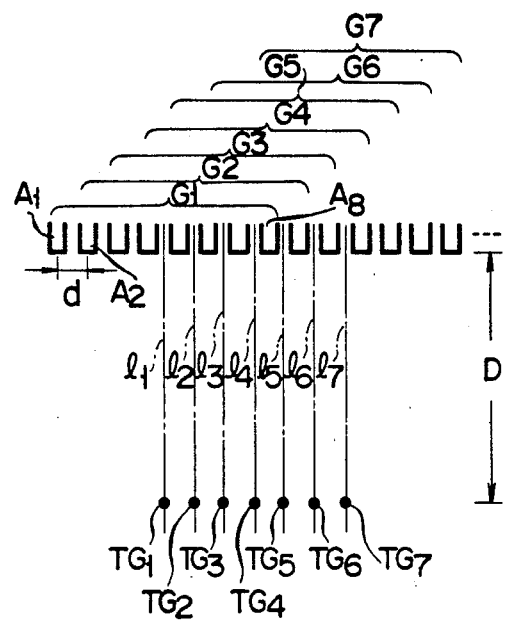
FIG. 8 shows a plurality of transducers which may form groups G1, G2, G3, G4, G5, G6 and G7 for radiating ultrasonic wave beams, thereby scanning targets TG1, TG2, TG3, TG4, TG5, TG6 and TG7 which lie respectively on the axes l1, l2, l3, l4, l5, l6 and l7 of the ultrasonic wave beams.
Figure 9:
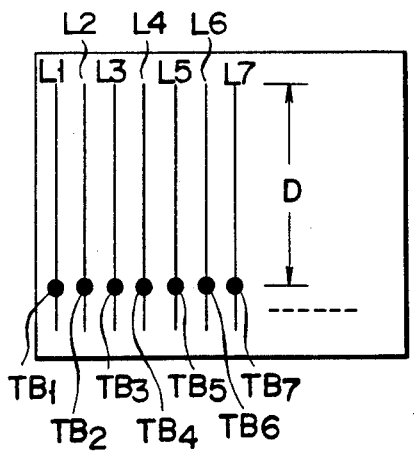
FIG. 9 shows the screen of a CRT display device, which displays tomogram components TB1, TB2, TB3, TB4, TB5, TB6 and TB7 respectively on scanning lines L1, L2, L3, L4, L5, L6 and L7, said tomogram components having been provided by processing data which the groups G1 to G7 of transducers shown in FIG. 8 have received and which include unnecessary artifact data.
Figure 10:
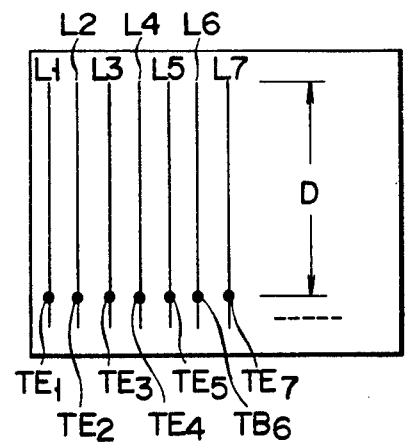
FIG. 10 shows the screen of a CRT display device, which displays tomogram components TE1, TE2, TE3, TE4, TE5, TE6 and TE7 respectively on scanning lines L1, L2, L3, L4, L5, L6 and L7, said tomogram components having been provided by processing only necessary data.

Suppose, as shown in FIG. 8, transducer groups G1 to G7 generate ultrasonic field patterns which have axes l1 to l7, respectively, and that targets TG1 to TG7, each of whose lateral size is smaller than the interval "d", are laid respectively on the axes l1 to l7—all at a distance D from the respective groups G1 to G7. In this case, as illustrated in FIG. 9, tomogram components TB1 to TB7 corresponding respectively to data B1 to B7 obtained from the targets TG1 to TG7 are displayed on the scanning lines L1 to L7 of a CRT display device, which correspond to the transducer groups G1 to G7, respectively. Each of the data B1 to B7 contains not only ultrasonic echo data reflected from the target, but also unnecessary artifact data.

Let TE1 to TE7 denote tomogram components corresponding exclusively to the necessary ultrasonic echo data reflected from the targets TG1 to TG7, the ultrasonic intensities of which are equal to E1 to E7, respectively. Then, the data B1 to B7 may be expressed as follows:

$$B1 = E1 + \alpha E2 + \beta E3 \quad (1\text{-a})$$
$$B2 = \alpha E1 + E2 + \alpha E3 + \beta E4 \quad (1\text{-b})$$
$$B3 = \beta E1 + \alpha E2 + E3 + \alpha E4 + \beta E5 \quad (1\text{-c})$$
$$B4 = \beta E2 + \alpha E3 + E4 + \alpha E5 + \beta E6 \quad (1\text{-d})$$
$$B5 = \beta E3 + \alpha E4 + E5 + \alpha E6 + \beta E7 \quad (1\text{-e})$$
$$B6 = \beta E4 + \alpha E5 + E6 + \alpha E7 \quad (1\text{-f})$$
$$B7 = \beta E5 + \alpha E6 + E7 \quad (1\text{-g})$$

In the above-given equations, $\alpha$ and $\beta$ are the contribution rates for the forming the artifacts (undesired tomogram components), as described with reference to FIGS. 5 and 6A to 6D, assuming that contribution rates other than those of $\alpha$ and $\beta$ are negligibly small.

If $\alpha$-multiplied and $\beta$-multiplied terms are eliminated from equations (1-a) to (1-g), unnecessary artifact components will be removed from the data B1 to B7. The equations (1-a) to (1-g) may be solved as simultaneous equations, because contribution rates $\alpha$ and $\beta$ can be obtained by means of a phantom, for example, which is equivalent to tissue of a human being under the same condition as described with reference to FIGS. 5 and 6A to 6D. Since, however, the contribution rates $\alpha$ and $\beta$ in general are functions of a radiating aperture (the number of simultaneously excited transducers), frequency of an ultrasonic wave beam and a focus thereof, they may be fixed theoretically by using currently available technical data.

Figure 11:
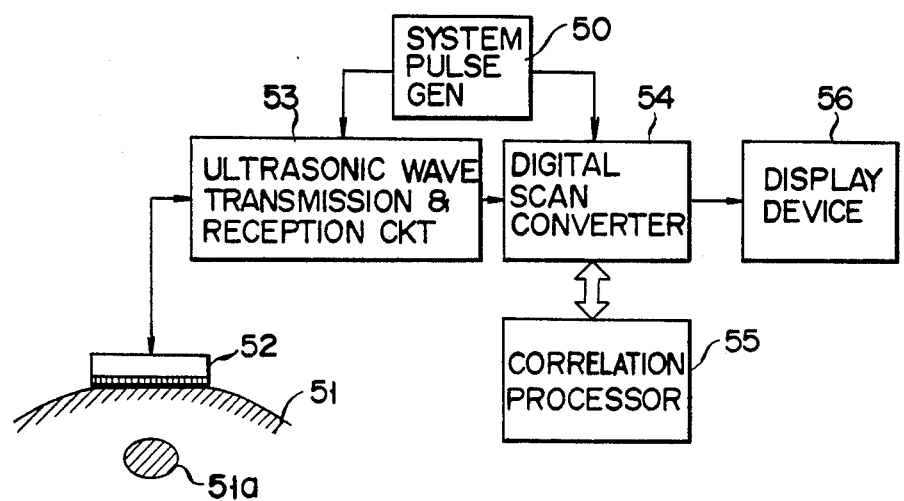
FIG. 11 is a block diagram of an ultrasonic diagnosing apparatus according to this invention.
Figure 12:
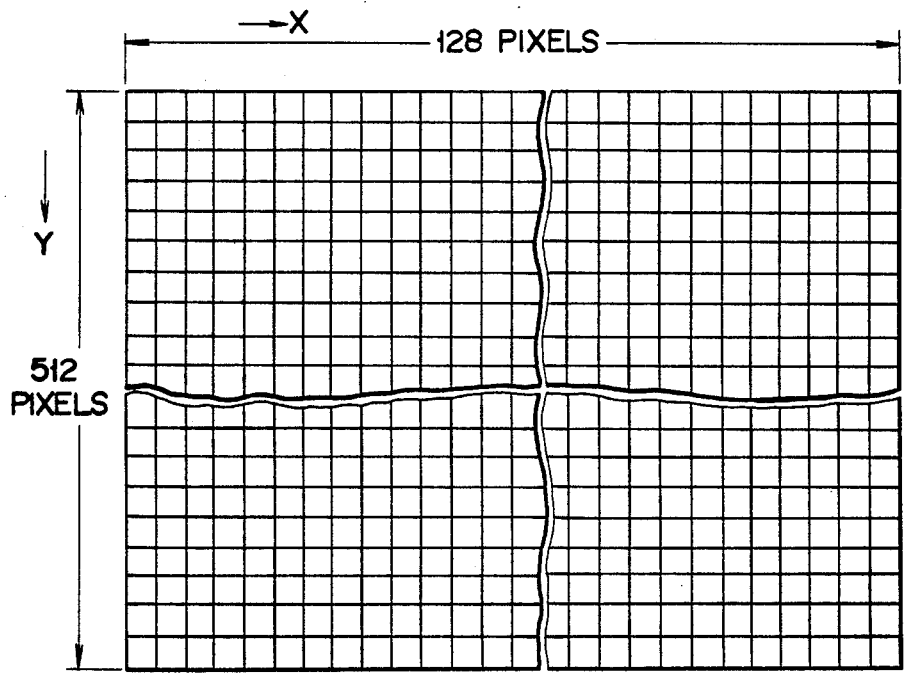
FIG. 12 shows a picture cell arrangement for displaying a tomogram.

FIG. 11 shows one embodiment of an ultrasonic diagnosing apparatus to which the correlation processing technique is applied. The apparatus includes a probe 52 which is adapted to be put on a patient 51 thereby to scan a target 51a within the patient's body. The probe 52 comprises a number of transducers (a transducer array). The apparatus further includes a system pulse generator 50, an ultrasonic wave transmission and reception circuit 53, a digital scan converter 54, a correlation processor 55 and a display device 56. The circuit 53 controls the excitation of the transducers of the probe 52 and carries out signal processing such as detection and amplification of reflected ultrasonic echoes from the target 51a. The digital scan converter 54 stores output signals of the circuit 53 which correspond to the reflected ultrasonic echoes. The scan converter 54 has a frame memory, though not shown in FIG. 11, having capacity large enough to store at least digital data which form one tomogram on the screen of the display device 56. As shown in FIG. 12, one tomogram displayed on a CRT display device is made up of a 128×512 pixel matrix, for example, each row extending in the horizontal scanning direction (X direction) of the television format consisting of 128 pixels and each column extending in the ultrasonic beam direction (Y direction) consisting of 512 pixels. Thus, the scan converter 54 includes such a memory capacity large enough to store at least 128×512 pixel data. The correlation processor 55 reads the digital data from the memory in the scan converter 54, removes unnecessary artifact components from each data by eliminating both $\alpha$-multiplied terms and $\beta$-multiplied terms from the equation representing the data, and writes each data thus corrected and containing no unnecessary artifact components into the memory of the scan converter 54. The display device 56 includes a T.V. monitor for displaying a tomogram which corresponds to correct data supplied from the scan converter 54.

Now it will be described how the ultrasonic diagnosing apparatus operates.

As described previously, contribution rates α and β may be obtained for every pixel of the memory matrix as shown in FIG. 12. The contribution rates α and β of each pixel are stored in advance in a programmable read only memory (not shown) of the correlation processor 55.

When the circuit 53 is driven under the control of the system pulse generator 50, the probe 52 carries out linear scanning on the target 51a. The probe 52 receives ultrasonic echoes reflected from the target 51a and converts them into electric signals. The electric signals are supplied to the circuit 53. The circuit 53 detects and amplifies the electric signals, which, in turn, are supplied to the digital scan converter 54 and stored into the corresponding address of the memory in the scan converter 54 designated by the address signals supplied from the system pulse generator 50.

When all the data that form one tomogram are stored in the scan converter 54, the correlation processor 55 starts reading the digital data one after another from the converter 54 and correct each digital data, using α and β of the pixel, thus obtaining desirable digital data. The correlation processor 55 then transfers the data to the memory in the scan converter 54. The desirable data are supplied from the scan converter 54 to the display device 56 for displaying on its screen a tomogram of the target 51a by means of the brightness modulation.

The tomogram thus displayed has an improved resolution because its components displayed on the respective scanning lines of the screen of the display device 56 do not contain a large amount of the artifact ones.

Now, the construction and operation of the digital scan converter 54 and correlation processor 55 will be described in detail.

The digital scan converter 54 includes an analog-to-digital converter (ADC) 61 for converting the output analog signal of the ultrasonic wave transmission and reception circuit (hereinafter referred to as T/R circuit) 53 into a digital signal, a line buffer memory 62 for temporarily storing the output digital data of the ADC 61, a frame memory 63 for storing the output data of the line buffer memory 62, a line buffer memory 64 for temporarily storing the output data of the frame memory 63, a digital-to-analog converter (DAC) 65 for converting the output data from the line buffer memory 64 into an analog signal, and a memory controller 66 for controlling the operation of the afore-mentioned components 61, 62, 63 and 64 according to the pulse signal from the system pulse generator 50.

The correlation processor 55 includes a programmable read only memory (PROM) 67 for storing the contribution rates α and β and a program (micro-instructions), a random access memory 68 for storing the digital data transferred from the frame memory 63, and a micro-processor 69 for executing the program stored in the PROM 67. The PROM 67, RAM 68 and micro-processor 69 are interconnected through an address bus 70, a data bus 71 and a control bus 72.

Now, the operation of the digital scan converter 54 and correlation processor 55 will be described.

The ADC 61 samples the output analog signal from the ultrasonic T/R circuit 53 and converts it into a digital signal for a predetermined period in response to a sampling signal from the memory controller 66. The digital signal thus obtained is coupled to the line buffer memory 62 and temporarily stored therein in accordance with a write control signal supplied from the memory controller 66 to the line buffer memory 62. The line buffer memory 62 is comprised of two memory units, each of which has a memory capacity of storing the output data corresponding to 512 pixels of one column (in the Y direction) in the matrix shown in FIG. 12. To the line buffer memory 62 is supplied an address signal from the memory controller 66 so that the output digital signal of the ADC 61 is stored in a predetermined address of one memory unit according to the address signal, while the data previously stored in another memory unit of the line buffer memory 62 are concurrently read out and provided to the frame memory 63 according to the read control signal supplied from the memory controller 66. Like the line buffer memory 62, to the frame memory 63 an address signal from the memory controller 66 is coupled so that the data from the line buffer memory 62 is stored in a predetermined address of the frame memory 63. In each data transferring, the digital data for each column, successively shifted for one column in the X direction in the matrix of FIG. 12, are coupled from the line buffer memory 62 to the frame memory 63. When digital data for 128 columns by 512 rows, i.e., for one tomogram are stored in the frame memory 63, the micro-processor 69 in the correlation processor 55 starts the execution of the program stored in the PROM 67 for obtaining the desirable data about the 128×512 pixels.

Figure 14:
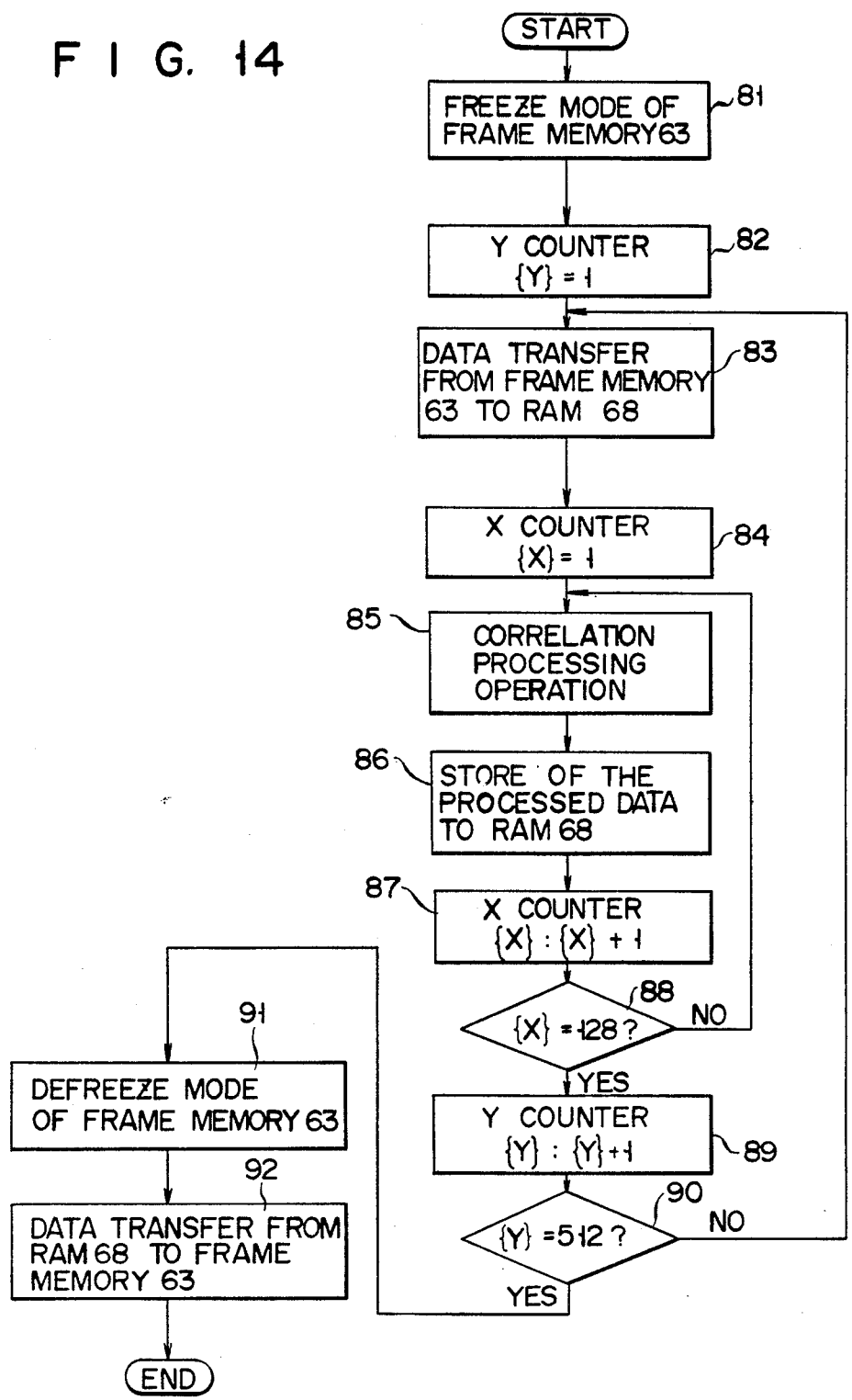
FIG. 14 illustrates a flow chart of a program by which data processing is carried out.

Now, the data processing for obtaining the desirable data will be described with reference to the flow chart shown in FIG. 14. The following data processing is all effected under the control of the micro-processor 69.

When the digital data for one tomogram is stored in the frame memory 63, a step 81 is executed to set the frame memory 63 to a freeze mode, in which the writing operation is inhibited and only the reading operation is permitted. Then, in a step 82 the contents of a Y-counter (not shown) in the micro-processor 69 is set to "1", i.e. $\{Y\}=1$. In a subsequent step 83, data for one row (128 pixels) in the X direction on the axis of $Y=1$ stored in the frame memory 63 are transferred to the RAM 68. Then, in a step 84 the contents of an X-counter (not shown) in the micro-processor 69 is set to "1", i.e. $\{X\}=1$. Then, a step 85 is executed, in which a correlation processing is carried out for obtaining the desirable data using the data of the contribution rates α and β stored in the PROM 67, namely, the micro-processor 69 fetches the data of the contribution rates α and β and the first one of the data stored in the RAM corresponding to the point of x, y=(1, 1) and solves the equations (1-a) to (1-g) as simultaneous equations. Thereafter, in a step 86 the data obtained as a result of the correlation processing is stored in the corresponding address of the RAM 68. In a subsequent step 87, the content of the X-counter in the micro-processor 69 is changed to $\{X\}+1$. In this state, a data processing similar to that mentioned earlier in connection with steps 85 and 86 is carried out to obtain the desirable data of the pixel at the point of the co-ordinates $(\{X\}:\{X\}+1, \{Y\}=1)$, the desirable data being stored in the corresponding address in the RAM 68. In a subsequent step 88, whether $\{X\}=128$ is checked. If $\{X\}=128$ is not reached, the process returns to the correlation processing operation in the step 85. However, if $\{X\}=128$ is reached, a step 89 is executed, in which the content of the Y-counter is changed to $\{Y\}+1$. In this step, a signal processing similar to that in case of $\{Y\}=1$ is carried out to obtain the desirable data of 128 pixels in one row on $\{Y\}+1$ on the Y axis. Then, in a step 90 whether $\{Y\}=512$ is checked. If it is not equal, the process returns to the step 83. If it is equal, then the desirable data for all the 128×512 pixels are obtained, so that a step 91 is executed, in which the freeze mode of the frame memory 63 is released. In a subsequent step 92, the desirable data for the 128×512 pixels stored in the RAM 68 is transferred to the frame memory 63. In the above way, the desirable data for one picture frame (i.e., 128×512 pixels) are obtained and stored in the memory 63. The data stored in the frame memory 63 is transferred to the line buffer memory 64 under the control of the memory controller 66. The line buffer memory 64 includes two memory units, each of which has memory capacity of storing the output data of the frame memory 63 corresponding to 128 pixels of one row. To the line buffer memory 64 is supplied to an address signal and read-/write control signals from the memory controller 66 so that the output data are stored in one memory unit, while the data previously stored in another memory unit are concurrently read out and provided to the DAC 65. Therefore, the line buffer memory 64 provides the desirable data of the 128×512 pixels to the DAC 65 in the television format. The DAC 65 converts the data into an analog signal and couples the same to the display device 56 as a brightness modulation signal. On the display device 56, the desirable data are displayed, and thus highly precise display of image can be obtained.

In the description of the above embodiments, a case of the linear scanning where the ultrasonic intensity distribution curve for the ultrasonic field is symmetrical with respect to the center line has been assumed for the simplicity of the description. Also, it has been mentioned that the equations (1-a), (1-b), . . . are applicable to this case.

However, the correlation processing technique may also be applied to other electronic scanning systems such as a sector scanning system and a composite scanning system (disclosed in U.S. Pat. No. 4,075,598, for example) in which ultrasonic field patterns in general are asymmetrical with respect to a reference axis. In taking such systems into consideration, the equations (1-a) to (1-g) should be modified to describe the ultrasonic echo intensity in the form of general equations. With reference to FIGS. 15 and 16A to 16D, the general equations will now be explained.

Figure 15:
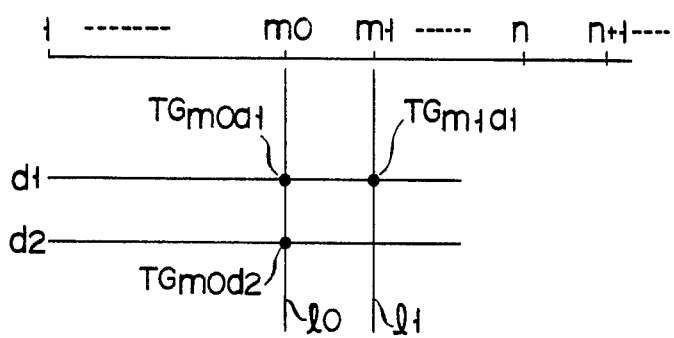
FIG. 15 illustrates a schematic diagram in which the ordinate is taken for the depth of the position of the target, and the abscissa is taken for the reference position of radiation of the ultrasonic wave beam.

FIG. 15 shows a schematic diagram, in which the ordinate is taken for the depth of the position of the target, and the abscissa is taken for the reference position of radiation of the ultrasonic wave beam. Labeled $TG_{m0d1}$ is a target located on a reference line 10 and at a depth d1, labeled $TG_{m0d2}$ is a target located on the reference line 10 and at a depth d2, and labeled $TG_{m1d1}$ is a target located on a reference line 11 and at a depth d1.

Figure 16A:
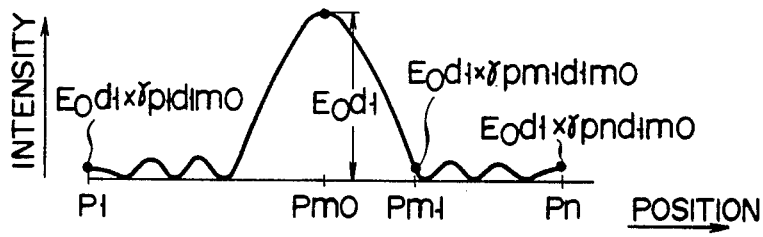
FIG. 16A shows an ultrasonic intensity distribution curve obtained on a plane at the depth d1 with the ultrasonic wave beams set on the reference line l0 by driving the 1st to n-th transducers.
Figure 16B:
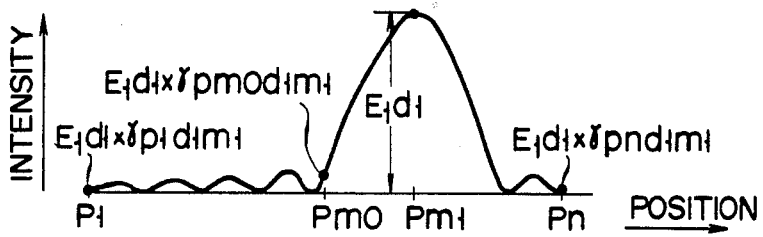
FIG. 16B shows an ultrasonic intensity distribution curve obtained on a plane at the depth d2 with the reference wave beams set on the line l1 by driving the 2nd to (n+1)th transducers.
Figure 16C:
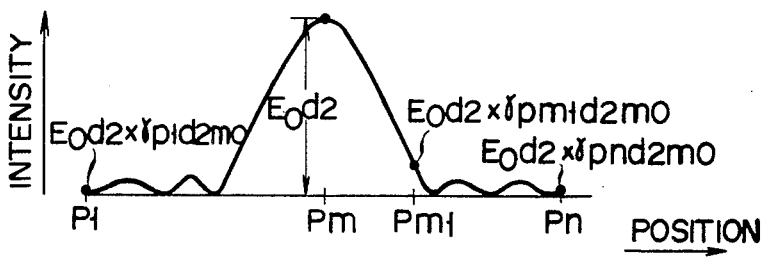
FIG. 16C shows the ultrasonic intensity distribution curve obtained on a plane at the depth d2 with the ultrasonic wave beams set on a reference line l0 by driving the 1st to n-th transducers.

FIG. 16A shows an ultrasonic intensity distribution curve obtained on a plane at the depth d1 with the ultrasonic wave beam set on the reference line 10 by driving the 1st to n-th transducers. FIG. 16B shows an ultrasonic intensity distribution curve obtained on a plane at the depth d1 with the reference wave beam set on the line 11 by driving the 2nd to (n+1)th transducers. FIG. 16C shows the ultrasonic intensity distribution curve obtained on a plane at the depth d2 with the ultrasonic wave beam set on a reference line 10 by driving the 1st to n-th transducers.

If it is assumed that the maximum intensity of the ultrasonic wave beam is located along the reference line 10 by driving the 1st to n-th transducers, the resultant ultrasonic echo intensity $B_{m0d1}$ obtained from the plane at the depth d1 contains the component of the echo from the target $TG_{m0d1}$ as well as that of the echo from the target $TG_{m1d1}$. Thus, with reference to FIGS. 16A and 16B, the resultant ultrasonic echo intensiby $B_{m0d1}$ is given by $$\begin{aligned}B_{m0d1} = &(E_{0d1} + E_{1d1} \times \gamma_{p1d1m1}) \times \gamma_{p1d1m0} + \cdots \\ &+ (E_{0d1} + E_{1d1} \times \gamma_{pm0d1m1}) \\ &+ (E_{0d1} + E_{1d1}) \gamma_{pm1d1m0} + \cdots \\ &+ (E_{0d1} + E_{1d1} \times \gamma_{pnd1m1}) \times \gamma_{pnd1m0} + \cdots\end{aligned} \quad (2\text{-a})$$

where $E_{0d1}$ and $E_{1d1}$ are respectively the maximum ultrasonic intensity at positions $P_{m0}$ and $P_{m1}$, and $\gamma_{p1d1m0}$ and $\gamma_{p1d1m1}$, $\gamma_{pm0d1m1}$, $\gamma_{pm1d1m0}$ and $\gamma_{pnd1m0}$ and $\gamma_{pnd1m1}$ are respectively the contribution rates at positions $P_1$, $P_{m0}$, $P_{m1}$ and $P_n$.

Likewise, a similar equation for the reflected ultrasonic echo intensity in case of driving the 2nd to (n+1)th transducers, a similar equation in case of driving the 3rd to (n+2)th transducers and so forth, that is, a total (n−1) similar equations are eventually obtained as (n−1) simultaneous equations. The resultant ultrasonic echo intensity $B_{m1d1}$ obtained from the targets $TG_{m0d1}$ and $TG_{m1d1}$ at the depth d1 by driving the 2nd to (n+1)th transducers, for example, is given by $$\begin{aligned}B_{m1d1} = &(E_{0d1} \times \gamma_{p1d1m0} + E_{1d1}) \times \gamma_{p1d1m1} + \cdots \\ &+ (E_{0d1} + E_{1d1}) \times \gamma_{pm0d1m1} + E_{1d1} + \cdots \\ &+ (E_{0d1} \times \gamma_{pnd1m0} + E_{1d1}) \times \gamma_{pnd1m1} + \cdots\end{aligned} \quad (2\text{-b})$$

By solving these equations, the desirable data on the reference line 10 at the depth d1, on the reference line 11 at the depth d1, and so forth, can be obtained.

Where the maximum intensity of the ultrasonic wave beam is located along the reference line 10 with the driving of the 1st to n-th transducers, the resultant ultrasonic echo intensity $B_{m0d2}$ obtained from the target $TG_{m0d2}$ at the depth d2 is, with reference to FIG. 16C, given by $$B_{m0d2} = (E_{0d2} \times \gamma_{p1d2m0}) + E_{0d2} + (E_{0d2} \times \gamma_{pm1d2m0}) + (E_{0d2} \times \gamma_{pnd2m0}) \quad (2\text{-c})$$

where $E_{0d2}$ is the maximum ultrasonic intensity at position $P_{m0}$, and $\gamma_{p1d2m0}$, $\gamma_{pm1d2m0}$ and $\gamma_{pnd2m0}$ are respectively the contribution rates at positions $P_1$, $P_{m1}$ and $P_n$.

In the above way, the desirable data can be obtained even in case where the ultrasonic intensity distribution curve is asymmetrical.

Other ultrasonic echoes reflected from various planes at different depths upon applying other ultrasonic wave beams may be expressed in equations which are similar to equations (2-a), (2-b) and (2-c).

The present invention is not limited to the above-mentioned embodiments. The correlation processing technique in accordance with the present invention may be applied to a mechanical scanning type ultrasonic diagnosing apparatus in which a probe is comprised of a single transducer. Various modifications are possible within the scope of the invention.

What is claimed is:

1. An ultrasonic diagnosing apparatus comprising:
a probe means for radiating a plurality of ultrasonic wave beams toward a target from which an ultrasonic echo data is reflected;
means for controlling said probe means to radiate a plurality of consecutive, spaced ultrasonic wave beams in predetermined ultrasonic field patterns in which each wave beam has substantially the same ultrasonic intensity distribution including a wave beam axis and in which the wave beam axis of a wave beam is spaced from the wave beam axis of the adjacent wave beam by a pre-selected distance, whereby the intensity level of the ultrasonic echo data reflected from the target is maximum for the wave beam having a wave beam axis which is the smallest lateral distance from the target and the intensity level of the ultrasonic echo data reflected from the target corresponding to the other wave beams becomes progressively lower, by multiples of decreasing correlation coefficients, as the lateral distance between the target and the wave beam axes of the respective wave beams increases;

means for converting the ultrasonic echo data reflected from the target into electrical signals indicative of a tomogram of the target;

means for processing the electrical signals representing the reflected ultrasonic echo data and correcting the tomogram by eliminating signal components of the tomogram which are correlation coefficient-multiplied signals;

means for displaying a corrected tomogram of the target in response to output signals of said processing means; and means for generating and supplying a system synchronizing pulse to said controlling means and said processing means.

2. The apparatus of claim 1 wherein said processing means includes a frame memory having a memory capacity for storing at least echo data corresponding to one frame of a tomogram, a memory for storing predetermined correlation coefficients, and a microprocessor for performing correction processing on the echo data stored in said frame memory by using the correction coefficients stored in the memory.

3. The apparatus according to claim 2 wherein said processing means includes a digital scan converter for converting the electrical signals indicative of a tomogram into a television display signal.

4. The apparatus according to claim 1 wherein the probe means includes a plurality of electrical scanning type transducers disposed in a linear array.

5. The apparatus of claim 1 wherein said signal processing means includes an analog-to-digital converter for converting the electrical signals indicative of a tomogram into digital signals, a first line buffer memory for temporarily storing the output data of said analog-to-digital converter, a frame memory having a memory capacity for storing at least data corresponding to one frame of a tomogram, a second line buffer memory for temporarily storing the data of said frame memory, and an analog-to-digital converter for converting the output data of said second line buffer memory into an analog television display signal.

6. The apparatus according to claim 5 wherein said processing means further includes a memory for storing predetermined correlation coefficients, and a microprocessor for performing correction processing on the echo data stored in said frame memory by using said stored predetermined correlation coefficients.

7. The apparatus of claim 6 wherein said microprocessor includes means for reading each pixel of the tomograph separately, performing the correction process on each separate pixel, and transforming the corrected data to the second line buffer memory.

8. An ultrasonic diagnosing apparatus comprising:

a plurality of laterally juxtaposed transducers disposed in a linear array, each of the transducers adapted to transmit an ultrasonic wave toward a target;

controlling means connected to said transducers for energizing a plurality of predetermined groups of transducers successively to radiate a plurality of consecutive, spaced ultrasonic wave beams in predetermined ultrasonic field patterns in which each wave beam has substantially the same ultrasonic intensity distribution symmetric about a beam axis and the wave beam axis of a wave beam is spaced from the axis of the adjacent wave beam by a preselected distance, whereby the intensity level of the ultrasonic echo data reflected from the target is maximum for the wave beam having a beam axis which is the smallest lateral distance from the target and the intensity level of the ultrasonic echo data from the target corresponding to the other wave beams becomes progressively lower, by multiples of decreasing correlation coefficients, as the lateral distance between the target and the axes of the respective beams increases, means for processing the electrical signals representing the reflected ultrasonic data and correcting the tomograph by eliminating signal components of the tomograph which are correlation coefficient-multiplied signals;

means for displaying the corrected tomograph of the target in response to the output signal of said processing means; and means for generating and supplying a system synchronizing pulse to said controlling means and said processing means.

9. The apparatus of claim 8 wherein said controlling means includes means to energize consecutive groups of transducers, each group including at least one transducer common to the preceding group of transducers, which form overlapping wave beams.

10. The apparatus of claim 9 wherein said processing means includes a memory in which is stored predetermined correlation coefficients and micro-instructions for eliminating the coefficient-multiplied signal components, and a processor for executing the micro-instructions.

* * * * *